United States Patent Office 3,248,419
Patented Apr. 26, 1966

3,248,419
PREPARATION OF HALOGENATED ESTERS FROM HALOGENATED CHLOROSULFATE
Murray Hauptschein, Glenside, Pa., and Milton Braid, Haddon Heights, N.J., assignors to Pennsalt Chemicals Corporation, Philadelphia, Pa., a corporation of Pennsylvania
No Drawing. Filed Jan. 3, 1964, Ser. No. 335,673
5 Claims. (Cl. 260—487)

This application is a continuation-in-part of our copending application Serial No. 735,702, filed May 16, 1958, for Halogenated Organic Compounds, now abandoned.

This invention relates to a new method for preparing halogenated esters.

In accordance with the present invention, a new one-step method has been found for preparing halogenated esters by the reaction of halogenated, and especially highly fluorinated, halosulfates with alcohols. In many instances, particularly in the case of highly halogenated esters, the method of the invention provides a simpler and more economical method of preparation. While according to conventional procedures, it is often necessary to prepare and isolate the carboxylic acid, and then convert the acid to an acyl halide which is finally reacted with the alcohol to produce the desired ester, in accordance with the invention the ester is prepared directly through a unique one-step reaction from the corresponding halogenated halosulfate.

The method of the invention may be illustrated by the reaction of a perfluoroalkylchlorosulfate, e.g.

$$CF_3CF_2CF_2OSO_2Cl$$

with ethyl alcohol to produce the ester of the perfluorinated acid

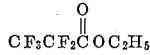

in accordance with the following:

$$CF_3CF_2CF_2OSO_2Cl + 3C_2H_5OH \longrightarrow$$

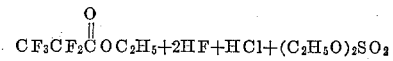

As may be seen, the reaction proceeds (from a formal standpoint) through the elimination of the halosulfate group and the conversion of the adjacent $CF_2$ group to the ester group

While the invention is neither limited to, nor depends upon, any particular reaction mechanism, it is believed that it proceeds according to the following:

$$CF_3CF_2CF_2OSO_2Cl + 2C_2H_5OH \longrightarrow$$
$$[CF_3CF_2CF_2OH] + (C_2H_5O)_2SO_2 + HCl$$

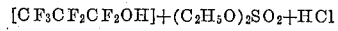

In accordance with the above, the alcohol first reacts with the halosulfate to form the unstable α,α-dihalo alcohol. This intermediate then loses HF to produce the acyl halide. The acyl halide in the presence of an excess of alcohol reacts further to produce the ester and another mole of HF.

Regardless of the validity of the above postulated reaction mechanism, it has been found that the reaction of the invention is unique to halosulfates in which the α-carbon atom (i.e. the carbon to which the halosulfate group is attached) is dihalogenated. For example, where the α-carbon atom is dihydrogenated (i.e. halosulfates of the type $RCH_2OSO_2X$ where X is chlorine or fluorine) esters are not formed. Similarly, where the α carbon is only monohalogenated as in halosulfates of the type $RCHXOSO_2X$ where X is chlorine or fluorine, the ester likewise does not form.

The halosulfates used as starting materials in the present invention include chlorosulfates and fluorosulfates of the general formula $RCX_2OSO_2X$ where X is fluorine or chlorine and where R is a halocarbon radical in which the halogens are preferably fluorine and/or chlorine. Preferred are halosulfates in which R is at least half halogenated (i.e. the ratio of halogen to carbon atoms is at least 1:1) and particularly those in which R is at least half fluorinated. If desired, R may contain various functional groups unreactive with alcohols under the reactions used such as nitro, alkoxy, nitrile or the like. The number of carbon atoms contained in the radical R is not critical as will be illustrated in the examples which follow, but in most practical applications, R will contain from 1 to 100 and more usually from 1 to 50 carbon atoms.

In the halosulfate starting materials, the sulfur of the halosulfate group is linked to the carbon atom in the $—CX_2—$ group through an oxygen atom. These halosulfates thus have the structure

than the sulfonyl halide structure

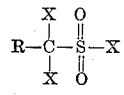

or the sulfonic acid structure

where the sulfur is connected directly to a carbon atom.

A class of halosulfates which are particularly valuable as starting materials are those in which the radical R in the formula given above is a perfluoroalkyl, a perfluorochloroalkyl, a perfluorohydroalkyl, or a perfluorochlorohydroalkyl radical. As used herein, the term perfluoro, as applied to radicals or compounds, means a radical or compound containing only fluorine and carbon. The term perfluorochloro denotes radicals or compounds containing only fluorine, chlorine and carbon in which the ratio of fluorine to chlorine atoms is at least 1:1. Perfluorohydro denotes compounds or radicals containing only fluorine, hydrogen and carbon in which the ratio of fluorine to hydrogen atoms is at least 1:1. The term perfluorochlorohydro denotes compounds or radicals containing only fluorine, chlorine, hydrogen and carbon in which the ratio of fluorine plus chlorine atoms to hydrogen atoms is at least 1:1. The valuable highly halogenated esters prepared from these preferred classes of halosulfates according to the invention are often difficult to prepare by other procedures.

The new method of the invention may be used for the preparation of polyesters (i.e. compounds containing two or more ester groups) as well for the preparation of monoesters. In this case, a polyhalosulfate (i.e. a compound containing 2 or more halosulfate groups) is used as the starting material and reacted with a monohydroxyalcohol or a polyhydroxyalcohol. A dihalosulfate, for example, when treated with a monohydroxy primary or secondary alcohol will produce a diester, whereas a dihalosulfate reacted with a polyhydroxyalcohol, e.g. diethylene glycol will produce a polyester.

The polyhalosulfate starting materials useful in the present invention are included within the scope of the general formula $RCX_2OSO_2X$ where X and R are as defined above. In the case of the polyhalosulfates, the halocarbon radical R will contain one or more additional $-CX_2OSO_2X$ groups as in the dihalosulfate $$ClO_2SOCF_2-[CF_2]_3-CF_2OSO_2Cl$$

A prefered class of polyhalosulfates useful as starting materials in the present invention are the dihalosulfates, particularly those of the general formula $$XO_2SOCX_2-R'-CX_2OSO_2X$$

where X is fluorine or chlorine and where R' is an alkylene radical from the class consisting of perfluoro, perfluorochloro, perfluorohydro, or perfluorochlorohydro alkylene radicals. Preferably, the radical R' will contain from 1 to 20 and particularly from 1 to 10 carbon atoms.

The halosulfate starting materials may be prepared by the reaction of a corresponding iodide $RCX_2I$ with chlorosulfonic or fluorsulfonic acid following the procedures described in detail in our co-pending application Serial No. 310,500, filed September 20, 1963 for Method for the Preparation of Halogenated Organic Compounds. The reaction between the iodide and the acid is carried out at temperatures ranging from $-20$ to $300°$ C. depending upon the particular iodide. The reaction is preferably carried out in the presence of a large excess of the acid. Reaction pressure is not critical and, where the iodide is not a volatile compound, the reaction is most conveniently carried out at atmospheric pressure. Reaction time is likewise not critical and will be adjusted in accordance with the reactivity of the particular iodide. Excess chlorosulfonic or fluorsulfonic acid may be removed by pouring the reaction mixture over crushed ice whereupon the halosulfate, being generally water insoluble, will separate as a lower organic layer. Where the halosulfate reaction product and the halosulfonic acid are immiscible, isolation of product is effected by simple phase separation.

A class of halosulfate starting materials of particular interest and value are those prepared from telomers of halogenated olefins, particularly telomers of tetrafluoroethylene, chlorotrifluoroethylene and vinylidene fluoride. The telomer iodides of such olefins may be prepared by known procedures and then converted to halosulfates to produce telomer halosulfates such as those of the formulae: $R[CF_2CF_2]_nOSO_2X$; $R[CF_2CFCl]_nOSO_2X$; and $R[CH_2CF_2]_nOSO_2X$ where R is halocarbon radical as defined above and where $n$ is an integer ranging from 1 to about 40.

Typical halosulfates that may be reacted with alcohols in accordance with the invention are the following:

$CF_3CF_2OSO_2Cl$
$CF_3CF_2CF_2OSO_2Cl$
$CF_3CF_2CF_2OSO_2F$
$CF_2ClCF_2OSO_2Cl$
$CFCl_2CF_2OSO_2Cl$
$CF_2ClCFClOSO_2Cl$
$CF_2ClCFClOSO_2F$
$CF_2BrCFClOSO_2Cl$
$CF_3CF_2CF_2CF_2OSO_2Cl$
$CF_2ClCCl_2OSO_2Cl$
$CHF_2CF_2OSO_2Cl$
$CHF_2CFClOSO_2Cl$
$CF_3CH_2CF_2OSO_2Cl$
$CF_2ClCH_2CF_2OSO_2Cl$
$C_3H_7CH_2CF_2OSO_2Cl$
$CF_2ClCFClCH_2CF_2OSO_2Cl$
$CFCl_2CF_2CH_2CF_2OSO_2Cl$

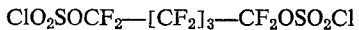
$CF_3CF_2\overset{CF_3}{\underset{|}{C}}F[CH_2CF_2]_3OSO_2Cl$
$C_7F_{15}CH_2CF_2OSO_2Cl$
$C_2F_5\overset{CF_3}{\underset{|}{C}}F[CH_2CF_2]_2OSO_2F$
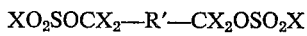
$C_3F_7[CF_2CF]_4[CF_2CF_2]_9OSO_2Cl$ with $CF_3$ substituent
$C_7F_{15}OSO_2Cl$
$CF_3[CF_2]_7OSO_2Cl$
$CF_2Cl\overset{CF_3}{\underset{|}{C}}F[CF_2CF_2]_2OSO_2Cl$
$CF_2Cl\overset{CF_3}{\underset{|}{C}}F[CF_2CF_2]_3OSO_2Cl$
$CF_2Cl\overset{CF_3}{\underset{|}{C}}F[CF_2CF_2]_4OSO_2Cl$
$CF_2Cl\overset{CF_3}{\underset{|}{C}}F[CF_2CF_2]_5OSO_2Cl$
$CF_3\overset{CF_3}{\underset{|}{C}}F[CF_2CF_2]_3OSO_2Cl$
$CF_3\overset{CF_3}{\underset{|}{C}}F[CF_2CF_2]OSO_2Cl$
$CF_3\overset{CF_3}{\underset{|}{C}}F[CF_2CF_2]_5OSOCl$
$CF_2=CFCF_2CF_2OSO_2Cl$
$CF_2=CFCF_2CFClOSO_2Cl$
$CF_3CF_2CFClOSO_2Cl$
$CF_3CF_2CCl_2OSO_2Cl$
$CF_2ClCF_2CCl_2OSO_2Cl$
$CHF_2CF_2CFClOSO_2Cl$
$CF_2ClCF_2CF_2OSO_2Cl$
$CFCl_2CF_2CF_2OSO_2Cl$
$CH_2ClCF_2CF_2OSO_2Cl$
$CH_3CF_2CF_2OSO_2Cl$
$O_2NCH_2CF_2CF_2OSO_2Cl$
$ONCH_2CF_2CF_2OSO_2Cl$ $ONCF_2CF_2CF_2OSO_2Cl$
$O_2NCH_2CF_2CF_2OSO_2Cl$
$CF_2CFClOSO_2Cl$

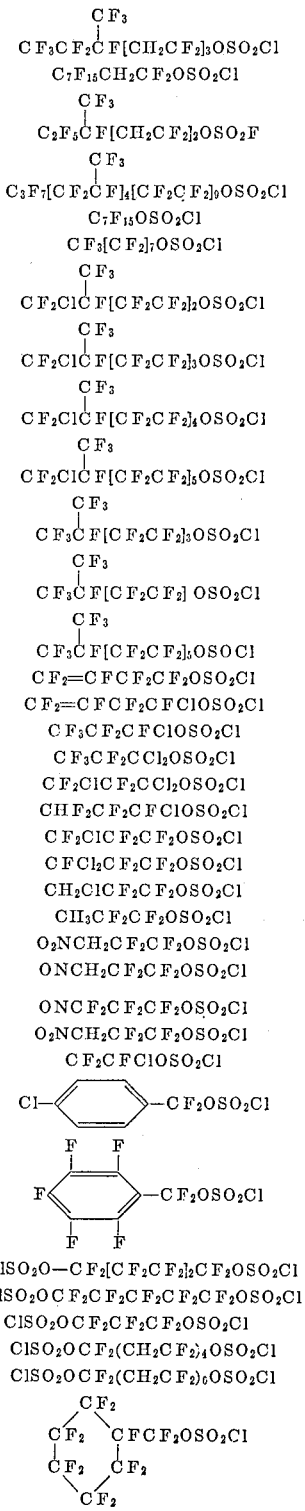

$ClSO_2O-CF_2[CF_2CF_2]_2CF_2OSO_2Cl$
$ClSO_2OCF_2CF_2CF_2CF_2CF_2OSO_2Cl$
$ClSO_2OCF_2CF_2CF_2OSO_2Cl$
$ClSO_2OCF_2(CH_2CF_2)_4OSO_2Cl$
$ClSO_2OCF_2(CH_2CF_2)_6OSO_2Cl$

In general any alcohol (i.e. an organic compound having a hydroxyl group attached to an aliphatic carbon atom free from unsaturation) will react with the specified class of halosulfates to form esters. Thus, the invention is applicable generally to primary, secondary and tertiary alcohols, including e.g. alkanols, both cyclic and acyclic, unsaturated alcohols, such as allyl alcohol, aralkyl alcohols such as benzyl alcohol and furfuryl alcohol; and alcohols containing various groups such as halogen, amino nitro, carboxy, amido, ether, thioether or ester groups. It is applicable to polyhydroxy alcohols as well as to monohydroxy alcohols. The primary alcohols (i.e. containing the —CH₂OH group) and the secondary alcohols (i.e. containing the >CHOH group) are especially suitable because of the readiness with which they react to form stable esters. The primary alkanols are a particularly suitable group. The number of carbon atoms in the alcohol is not critical, although the invention will find more usual application with alcohols having from 1 to 30 carbon atoms and most often from 1 to about 12 carbon atoms.

The following alcohols are typical of those useful in the process of the invention:

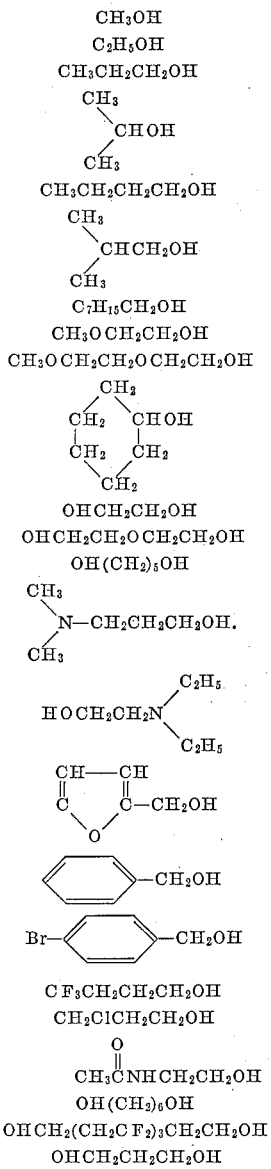

$CH_3OH$
$C_2H_5OH$
$CH_3CH_2CH_2OH$ $$\begin{array}{c}CH_3\\ \diagdown\\ CHOH\\ \diagup\\ CH_3\end{array}$$

$CH_3CH_2CH_2CH_2OH$ $$\begin{array}{c}CH_3\\ \diagdown\\ CHCH_2OH\\ \diagup\\ CH_3\end{array}$$

$C_7H_{15}CH_2OH$
$CH_3OCH_2CH_2OH$
$CH_3OCH_2CH_2OCH_2CH_2OH$ (cyclopentyl-CHOH structure)

$OHCH_2CH_2OH$
$OHCH_2CH_2OCH_2CH_2OH$
$OH(CH_2)_5OH$ $$\begin{array}{c}CH_3\\ \diagdown\\ N-CH_2CH_2CH_2OH\\ \diagup\\ CH_3\end{array}$$

$$HOCH_2CH_2N\begin{array}{c}C_2H_5\\ \diagdown\\ \\ \diagup\\ C_2H_5\end{array}$$

(epoxy structure: CH=CH / C-C-CH₂OH with O bridge)

(C₆H₅—CH₂OH, benzyl alcohol)

(Br—C₆H₄—CH₂OH)

$CF_3CH_2CH_2CH_2OH$
$CH_2ClCH_2CH_2OH$ $$CH_3\overset{O}{\overset{\|}{C}}NHCH_2CH_2OH$$

$OH(CH_2)_6OH$
$OHCH_2(CH_2CF_2)_3CH_2CH_2OH$
$OHCH_2CH_2CH_2OH$

The reaction between the chlorosulfate and the alcohol may be carried out over a relatively wide range of temperatures of from about —10° C. up to about 300° C. In general, temperatures of from 0° C. to 100° C. will be found preferable. Primary alcohols are generally most reactive, and usually temperatures in the range of from —10° C. to +50° C. are preferred for this type of alcohol.

Pressure is not a critical factor, and while the reaction is generally carried out most conveniently at atmospheric pressure, if desired sub-atmospheric or super-atmospheric pressures may be used.

The reaction time will vary considerably depending principally upon the reactivity of the alcohol. With primary alcohols, the reaction usually occurs quite rapidly and is complete in a matter of a few minutes to several hours. With the less reactive alcohols on the other hand, and/or in the case of long chain halosulfates where contact between the reactants may be a problem, longer reaction periods ranging e.g. from several hours to several days may be desirable.

Generally, it will be desirable to employ an excess of alcohol in order to insure a high conversion of the chlorosulfate. An excess of alcohol however is not necessary, and in some cases it may be desirable to employ the chlorosulfate in excess.

In most cases the reaction is preferably carried out under essentially anhydrous conditions in order to avoid hydrolysis of the chlorosulfate to a carboxylic acid and other complicating side reactions. The reaction may be carried out by merely mixing the chlorosulfate with the alcohol either in the absence or presence of a solvent. Suitable solvents include e.g. ethers such as diethyl ether, dimethoxyethane ($CH_3OCH_2CH_2OCH_3$), hydrocarbon solvents such as hexane, heptane, octane, benzene, toluene or xylene; chlorinated hydrocarbon solvents such as methylene chloride, chloroform, or chlorofluorinated hydrocarbons such as trichlorotrifluoroethane.

The reaction is usually carried out by slowly adding the halosulfate to an excess of the alcohol, or conversely by slowly adding an excess of the alcohol to the halosulfate, or to a solution or suspension thereof in an inert anhydrous solvent. The reaction is exothermic and cooling is sometimes desirable. The by-products of the reaction of the halosulfates with alcohols are the hydrogen halides (viz. HF and HCl) and the sulfate esters such as $C_2H_5O-SO_2-OC_2H_5$.

Isolation of the ester from the reaction mixture may generally be accomplished by pouring it into ice water and separating the organic phase from the aqueous. The crude ester or polyester may be washed, if desired, with water or mildly an alkaline aqueous solution e.g. of sodium bicarbonate, dried and then further purified by distillation, recrystallization or the like.

When the alcohol reactant contains another functional group having a labile hydrogen, such as an amino group, both groups may react with the halosulfate. Thus when an alcohol containing a primary or secondary amine group, e.g. monoethanolamine or N-ethylaminoethanol is reacted with the halosulfate both the hydroxyl and the amino group may react to provide amidoesters. If the amino group tends to react more readily than the hydroxyl as in ethanolamine, a sufficient excess of the halosulfate will be used to first form an amidoalcohol which will then react with additional halosulfate to form the amidoester.

In the reaction of a polyhalosulfate with a polyhydroxylalcohol to form a polyester, it may be particularly desirable to heat the reaction mixture at a temperature of e.g. 100° C., after the two components have been interacted at a relatively lower temperature, in order to produce high molecular weight polyesters. In carrying out the reaction of polyhalosulfates with polyalcohols to form polyesters, the use of an inert solvent is particularly desirable since the products of the reaction are relatively high melting solids.

The following examples are intended to illustrate the invention:

*Example 1.—Esterification of $C_3F_7-OSO_2Cl$*

To 2.8 grams (0.0098 mole) of $C_3F_7OSO_2Cl$, is added 1 gram (0.0022 mole) of absolute ethanol at room temperature. After the ensuing vigorous reaction subsides, the reaction mixture is refluxed in a heating bath at 80° C. for 1 hour. During refluxing, formation of an immiscible layer and etching of the glass reactor are observed. The lower layer is washed with dilute aqueous $NaHCO_3$ and dried with anhydrous calcium sulfate. After removal of the drying agent, there remains 2 grams of colorless fragrant liquid shown by infrared spectroscopic analysis to consist of 1.7 grams (0.0088 mole) of $$C_2F_5\overset{O}{\overset{\|}{C}}-OC_2H_5$$

(100% yield; 90% conversion) and 0.3 gram (0.001 mole) of unreacted $C_3F_7OSO_2Cl$.

*Example 2.—Esterification of $CF_3CF_2CF(CF_3)(CH_2CF_2)_3OSO_2Cl$*

A mixture of 3.5 grams (0.0067 mole) of the above chlorosulfate and 55 grams (0.108 mole) of absolute ethanol is allowed to reflux for 1.5 hours. The reaction mixture is poured into 20 cc. of ice water and the lower layer, (3.4 grams) of colorless liquid, is separated. After drying with anhydrous calcium sulfate, there is obtained by distillation in a small Vigreux still 2.7 grams (0.0062 mole; 92% yield) of the ethyl ester $$CF_3CF_2CF(CF_3)(CH_2CF_2)_2CH_2\overset{O}{\overset{\|}{C}}-OC_2H_5$$

having a boiling point of 77° to 81° C. at about 0.1 mm. Hg. The main fraction has a boiling point of 80° to 81° C. at about 0.1 mm. Hg and a refractive index $n_D^{29}$ 1.345. A band at 5.73μ in the infrared spectrum is attributed to the C=O stretching vibration of the ester.

*Example 3—Esterification of $CF_2ClCFClOSO_2Cl$.*

3 grams (0.065 mole) of absolute ethanol is added dropwise to 2.3 grams (0.0086 mole) of the above chlorosulfate cooled to 0° C. When the vigorous reaction subsides, the reaction mixture is reuuxed for 3 hours at 80° C. After cooling, ice water is added, and the resulting lower layer is separated and dried with anhydrous calcium sulfate. There is obtained 1.5 grams of colorless liquid shown by infrared spectral analysis to be $$CF_2Cl\overset{O}{\overset{\|}{C}}OC_2H_5$$

*Example 4.—Esterification of $C_2F_5(CF_2CF_2)_3OSO_2Cl$ followed by conversion of the ester to the alcohol*

$C_2F_5(CF_2CF_2)_3OSO_2Cl$, prepared by the reaction of $C_2F_5(CF_2CF_2)_3I$ with chlorosulfonic acid is converted to the methyl ester $$C_2F_5(CF_2CF_2)_2CF_2\overset{O}{\overset{\|}{C}}OCH_3$$

by reacting with an excess of methanol at reflux temperatures. The methyl ester is converted to the alcohol 1,1-dihydroperfluorooctanol, $C_2F_5(CF_2CF_2)_2CF_2CH_2OH$ by the following procedure. In a 2 liter, 3-necked flask equipped with a mercury-sealed Hershberg stirrer, a dropping funnel, and a water-cooled condenser, is placed 19 grams of lithium aluminum hydride in 600 ml. of anhydrous ethyl ether. The mixture is stirred for 3 hours, then a solution of 50 grams of methyl perfluorooctanoate in 50 ml. of anhydrous ether is added dropwise with constant stirring. The rate of addition is controlled by rate of the reflux of the ether in the reaction mixture, and the addition is completed in 2 hours. Stirring is continued for an additional 3 hours. 50 ml. of water is carefully added drop-wise to decompose the excess lithium aluminum hydride, the addition of water being determined by the rate of reflux. The reaction mixture is then poured into 1500 ml. of cold 10% sulfuric acid to decompose the complex. The ether layer is separated, and the aqueous layer extracted with ether in a continuous extraction apparatus. The ether extract is finally dried over anhydrous sodium sulfate. After removal of the ether by distillation, there is obtained an approximate 60% yield of $C_2F_5(CF_2CF_2)_2CF_2CH_2OH$, having a boiling point of 144° C., and a melting point of 37° C.

*Example 5.—Esterification of $C_2F_5CF(CF_3)$-$(CH_2CF_2)_3OSO_2Cl$ and conversion of the ester to the alcohol*

The above chlorosulfate is allowed to reflux for 2 hours with an excess of absolute ethanol to form the ester $$C_2F_5CF(CF_3)(CH_2CF_2)_2CH_2\overset{O}{\overset{\|}{C}}OC_2H_5$$

in good yield. This ester is reacted with lithium aluminum hydride according to the general procedure described in Example 4 to form the alcohol $$C_2F_5CF(CF_3)(CH_2CF_2)_2CH_2CH_2OH$$

This alcohol is useful in the production of improved diester lubricating oils produced for example, by reaction with a dicarboxylic acid chloride, such as e.g. sebacyl chloride to give $$C_2F_5CF(CF_3)(CH_2CF_2)_2CH_2CH_2O\overset{O}{\overset{\|}{C}}(CH_2)_6\overset{O}{\overset{\|}{C}}OCH_2CH_2(CF_2CH_2)_2(CF_3)CFC_2F_5,$$

or fluorine containing dihalosulfates particularly those containing repeating $(CH_2CF_2)$ units such as e.g. the dichlorosulfate $$ClO_2SOCF_2(CH_2CF_2)_4OSO_2Cl \text{ to give}$$

$$C_2F_5\overset{CF_3}{\overset{|}{C}}F(CH_2CF_2)_2CH_2CH_2O\overset{O}{\overset{\|}{C}}(CH_2CF_2)_3CH_2\overset{O}{\overset{\|}{C}}OCH_2CH_2(CF_2CH_2)_2\overset{CF_3}{\overset{|}{C}}FC_2F_5$$

*Example 6.—Esterification of $C_8F_{17}OSO_2Cl$*

To a solution of 30.0 grams (0.256 mole) of N,N-diethylaminoethanol in diethyl ether there is added dropwise 26.7 grams (0.05 mole) of $C_8F_{17}OSO_2Cl$ dissolved in diethyl ether. An exothermic reaction occurs. After refluxing the mixture for about two hours, it is cooled and filtered after which the solvent is evaporated to provide an oily residue. Upon distillation of this residue there is obtained about 10 grams of colorless oil having a boiling point of 70–77° C. at 1.2 mm. Hg, the spectrum of which shows a strong ester band at 5.62μ. Upon redistillation there is obtained a colorless oil having a boiling point of 71–72° C. at 0.8 mm. Hg consisting of the ester $$C_7F_{15}\overset{O}{\overset{\|}{C}}OCH_2CH_2N(C_2H_5)_2$$

The ester is analyzed as follows:
Calculated for $C_{14}H_{14}F_{15}NO_2$: C, 32.76; H, 2.75; F, 55.53; N, 2.73. Found: C, 33.19; H, 3.11; F, 53.80; N, 2.98.

In the preparation of the above ester, it is noted that the residue remaining after distillation, contains a crystalline solid melting at 210–215° C. It is also noted that a similar solid is slowly formed when the ester is permitted to stand at room temperature. It has been found that this solid results from the spontaneous isomerization of the ester to the N,N'-tetraethyl piperazinium salt of the perfluorocarbon acid $$C_7F_{15}\overset{O}{\overset{\|}{C}}OH$$

in accordance with the following:

$$2C_7F_{15}\overset{O}{\overset{\|}{C}}OCH_2CH_2N\overset{C_2H_5}{\underset{C_2H_5}{\diagup}} \longrightarrow$$

$$\left[(C_2H_5)_2N\overset{CH_2-CH_2}{\underset{CH_2-CH_2}{\diagup\diagdown}}N(C_2H_5)_2\right]^{++} 2C_7F_{15}\overset{O}{\overset{\|}{C}}O^{\ominus}$$

The above salt is a crystalline solid melting at 210–215° C. after recrystallization from a mixture of methanol and ethyl acetate. Its infrared spectrum shows only a strong $$\overset{O}{\overset{\|}{C}}$$

band at 5.95μ and no ester band at 5.62μ. This compound, having the same molecular formula as the above ester, is analyzed as follows:

Calculated for: $C_{14}H_{14}F_{15}NO_2$: C, 32.76; H, 2.75; F, 55.53; N, 2.73. Found: C, 32.88; H, 2.94; F, 55.53; N, 2.91.

*Example 7.—Esterification of*

$$CF_2Cl\overset{CF_3}{\underset{|}{C}}F(CF_2CF_2)_3OSO_2Cl$$

To a solution of 30.0 grams (0.256 mole) of N,N-diethylaminoethanol in diethyl ether there is added dropwise 30 grams (0.056 mole) of the above chlorosulfate dissolved in diethyl ether. An exothermic reaction occurs and the mixture separates into two liquid phases. The ether soluble layer is separated, and the ether insoluble phase is extracted repeatedly with hot diethyl ether. The ether layer and the ether extracts are combined and concentrated by evaporation of the solvent during which time a small amount of solid separates. This solid is filtered and the filtrate is heated under reduced pressure to remove additional solvent. An IR spectrum of the resultant liquid residue shows an ester band at 5.6μ indicating the production of the crude ester:

$$CF_2Cl\overset{CF_3}{\underset{|}{C}}F[CF_2CF_2]_2CF_2\overset{O}{\overset{\|}{C}}OCH_2CH_2N(C_2H_5)_2$$

It is found that this ester on heating during distillation in vacuo spontaneously isomerizes to the N,N'-tetraethyl piperazinium salt of the chlorofluorocarbon acid $$CF_2Cl\overset{CF_3}{\underset{|}{C}}F[CF_2CF_2]_2CF_2COOH$$

as follows:

$$2CF_2Cl\overset{CF_3}{\underset{|}{C}}F(CF_2)_5\overset{O}{\overset{\|}{C}}OCH_2CH_2N(C_2H_5)_2 \longrightarrow$$

$$[(C_2H_5)_2N\overset{CH_2-CH_2}{\underset{CH_2-CH_2}{\diagup\diagdown}}N(C_2H_5)_2]^{++}2CF_2Cl\overset{CF_3}{\underset{|}{C}}F(CF_2)_5\overset{O}{\overset{\|}{C}}-O^{\ominus}$$

The above salt is obtained on attempted distillation of the crude ester at a bath temperature of 100° C. at 1 mm. Hg pressure, whereupon the rearrangement takes place to give 12.6 grams of a crystalline solid having a melting point of 216–219° C. after repeated recrystallization from an ethyl acetate-methanol mixture. The infrared spectrum of the above piperazinium salt shows only the absorption band at 5.95μ. The salt is analyzed as follows:

Calculated for: $C_{15}H_{14}F_{16}ClNO_2$: C, 31.07; H, 2.44; F, 52.44; Cl, 6.12; N, 2.42. Found: C, 31.18; H, 2.54; F, 52.35; Cl, 6.22; N, 2.70.

The structure of the above piperazinium salt is proven by treating it with excess alcoholic HCl to provide the piperazinium dichloride and the free acid. Upon such treatment, a crystalline solid precipitates which is filtered off and found to be a water soluble solid melting at 350–360° C. and consisting of 1,1,4,4-tetraethyl piperazinium dichloride, the infrared spectrum of which shows the absence of any fluorine, or carbonyl function. Analysis of the piperazinium dichloride is as follows: Calculated for: $C_{12}H_{28}Cl_2N_2$: C, 53.17; H, 10.34; Cl, 26.16; N, 10.33. Found: C, 52.73; H, 10.68; Cl, 26.92; N, 10.13. The 1,1,4,4-tetraethyl piperazinium dichloride is further identified by formation of its picrate, a brilliant yellow compound melting at 273–275° C. after recrystallization from an ethanol acetone mixture.

The alcoholic filtrate remaining after removal of the tetraethyl piperazinium dichloride as described above is concentrated and there is obtained an oil which is identified as the acid moiety of the original piperazinium salt, viz.

$$CF_2Cl\overset{CF_3}{\underset{|}{C}}F[CF_2CF_2]_2CF_2COOH$$

The structure of the piperazinium salt obtained by isomerization of the original ester is proved further by the preparation of authentic 1,1,4,4-tetraethyl piperazinium dichloride by simply heating β-diethylaminoethyl chloride $(C_2H_5)_2NCH_2CH_2Cl$. The piperazinium dichloride thus obtained is converted to the dihydroxide by treatment with silver oxide. The dihydroxide is then used to neutralize a stoichiometric portion of the chlorofluorocarbon acid $$CF_2Cl\overset{CF_3}{\underset{|}{C}}F[CF_2CF_2]_2CF_2COOH$$

The piperazinium salt isolated from this synthesis is identical in melting point and infrared spectrum with the solid obtained by the isomerization of the ester.

*Example 8.—Esterification of*

$$CF_3\overset{CF_3}{\underset{|}{C}}F[CF_2CF_2]_3OSO_2F$$

The above fluorosulfate is added slowly to a 5 fold molar excess of n-butanol, after which the mixture is heated at 75° C. for about 2 hours. The reaction mixture is then poured into ice water and the lower water insoluble layer is separated and dried with anhydrous magnesium sulfate. The crude product is then distilled and a distillate obtained consisting of the butyl ester $$CF_3\overset{CF_3}{\underset{|}{C}}F[CF_2CF_2]_2CF_2\overset{O}{\overset{\|}{C}}-OCH_2CH_2CH_2CH_3$$

in good yield.

*Example 9.—Esterification of*

$$CF_3\overset{CF_3}{\underset{|}{C}}F[CF_2CF_2]_4OSO_2Cl$$

The above chlorosulfate is added to a 5 fold molar excess of benzyl alcohol with stirring after which the mixture is heated at 80° C. for about 2 hours. The reaction mixture is poured into ice water and the lower, water-insoluble layer is separated and dried with anhydrous magnesium sulfate. The crude product is distilled and the benzyl ester $$CF_3\overset{CF_3}{\underset{|}{C}}F[CF_2CF_2]_3CF_2\overset{O}{\overset{\|}{C}}-OCH_2-\hspace{-2pt}\bigcirc$$

is obtained in good yield.

*Example 10.—Preparation of diester of*
$$C_2F_5(CF_2CF_2)_3OSO_2Cl$$

In a 100 ml. round bottomed flask fitted with water-cooled condenser vented through a drying tube containing anhydrous calcium sulfate is placed 0.1 mole of $C_2F_5(CF_2CF_2)_3OSO_2Cl$ and an excess of 1,5-pentanediol. The reaction mixture is then allowed to reflux for several hours. After removal of excess 1,5-pentanediol, the product is washed with dilute aqueous sodium bicarbonate and dried with anhydrous calcium sulfate, and distilled. The pure diester

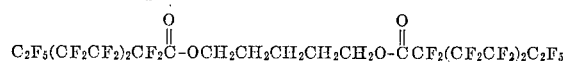

having a boiling point of 160° C. at 7 mm. Hg is obtained.

*Example 11.—Preparation of diester of*
$C_2F_5(CF_2CF_2)_3OSO_2F$

Using the same procedure as described in Example 10, the same diester is formed when $C_2F_5(CF_2CF_2)_3OSO_2F$ is reacted with an excess of 1,5-pentanediol.

*Example 12.—Preparation of polyester from*

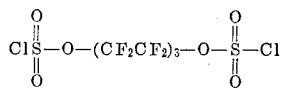

The above dichlorosulfate is reacted with an excess of hexamethyleneglycol [$HO(CH_2)_6OH$] at 100° C. for 1 day. A polyester is formed consisting of a thermoplastic solid, a linear polymer containing the repeating units

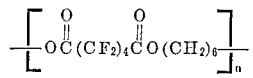

*Example 13.—Preparation of polyester from*

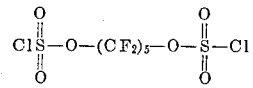

The above dichlorosulfate is reacted with an excess of trimethyleneglycol $HOCH_2CH_2CH_2OH$ at 100° C. for 2 hours to give a viscous oil (viscosity at 20° C. about 5000 centistokes) and a thermoplastic solid consisting of a linear polymer containing the repeating structure

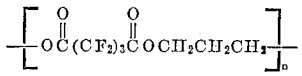

*Example 14.—Preparation of diester from*
$C_2F_5CF(CF_3)(CH_2CF_2)_3OSO_2Cl$

The above chlorosulfate and an excess of 1,5-pentanediol are placed in a flask fitted with a water-cooled condenser vented through a drying tube containing anhydrous calcium sulfate. The reaction mixture is then allowed to reflux for 4 hours. After removal of 1,5-pentanediol, the product is washed with dilute aqueous sodium bicarbonate and dried with anhydrous calcium sulfate, and distilled. The pure diester

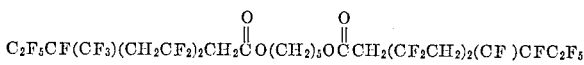

having a boiling point of 150° C. at about 0.1 mm. Hg is obtained in good yield. This diester is useful as a hydraulic fluid and lubricant.

*Example 15.—Diester of*
$C_2F_5CF(CF_3)(CH_2CF_2)_3OSO_2Cl$

The above chlorosulfate is reacted with an excess of diethylene glycol $HOCH_2CH_2OCH_2CH_2OH$ in the same manner as described in Example 14 to produce the diester

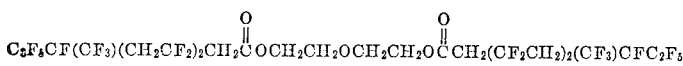

having approximately the same boiling point, viz., 150° C. at about 0.1 mm. Hg. This diester is also useful as a hydraulic fluid and lubricant.

*Example 16.—Conversion of*

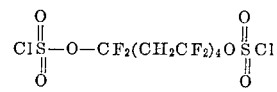

*to the diol*
$HO—CH_2(CH_2CF_2)_3—CH_2CH_2OH$

The above dichlorosulfate is first converted to the diester

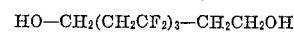

by reacting with methanol at reflux temperatures for 3 hours. The diester is then converted to the diol $HOCH_2(CH_2CF_2)_3CH_2CH_2OH$ in about 80% yield by reaction with lithium aluminum hydride in refluxing ether in accordance with the general procedures described in Example 4. This diol may be reacted with monocarboxylic acid chlorides to give diesters useful as hydraulic fluids. This diol is a particularly useful intermediate for the production of polyesters by condensation with dicarboxylic acid chlorides, such as adipyl chloride or terephthaloyl chloride, or fluorine containing dihalosulfates particularly those containing repeating ($CH_2CF_2$) units such as the above dichlorosulfate. The resulting polyesters are thermoplastic solids which have excellent film and fiber forming properties. The condensate of the above diol with adipyl chloride or terephthaloyl chloride give polymers containing repeating units

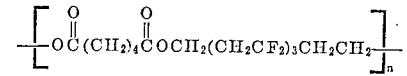

and

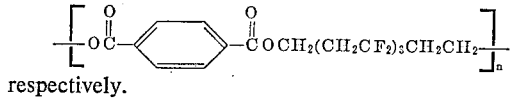

respectively.

*Example 17.—Diester of*
$C_2F_5CF(CF_3)(CH_2CF_2)_3OSO_2Cl$

The above chlorosulfate and an excess of the diol
$HOCH_2(CH_2CF_2)_3CH_2CH_2OH$ prepared in accordance with Example 16, are placed in a flask fitted with a water cooled condenser vented through a drying tube containing anhydrous calcium sulfate. The reaction mixture is allowed to reflux for several hours, and after removal of the excess diol, the product is washed with dilute aqueous sodium bicarbonate, dried with anhydrous calcium sulfate, and distilled to obtain the diester

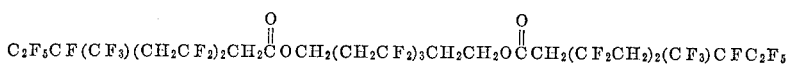

having a boiling point of 170° C. at about 1.1 mm. Hg. As with the diesters of Examples 14 and 15, this diester is useful as a hydraulic fluid and lubricant.

13

*Example 18.—Preparation of polyester from*

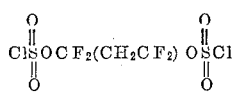

The above dichlorosulfate is reacted with trimethyleneglycol $HOCH_2CH_2CH_2OH$ at 80° C. to form a polyester consisting of a thermoplastic solid containing the repeating units:

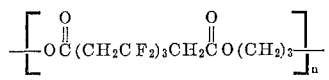

*Example 19.—Polyester from*
$ClO_2SOCF_2(CH_2CF_2)_4OSO_2Cl$
and
$HOCH_2(CH_2CF_2)_3CH_2CH_2OH$ The above diol, prepared in accordance with Example 16 is reacted with an excess of the above dichlorosulfate at 100° C. for about 1 day. A polyester is formed consisting of thermoplastic solid, a linear polymer containing the repeating units

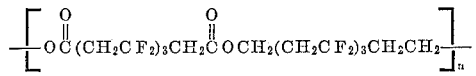

This linear polyester has excellent film forming and fiber forming properties. It is readily orientable probably due to the presence of the repeating ($CH_2CF_2$) units throughout the molecule.

The esters, and particularly the diesters derived from the halosulfates of the invention are, as previously noted, excellent lubricants and hydraulic fluids. They are also useful as plasticizers for halogen containing resins. Thus, esters containing repeating ($CH_2CF_2$) units such as the diester,

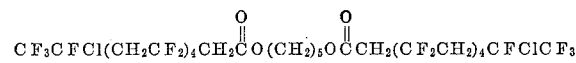

is an excellent plasticizer for homopolymers of $CH_2=CF_2$ or copolymers of $CH_2=CF_2$ with ethylene or with halogen substituted ethylenes.

As noted above, the polyesters prepared from the polyhalosulfates of the invention are useful plastics having good flame resistance. The polyesters containing repeating ($CH_2CF_2$) units are particularly useful because of their ability to undergo orientation and produce oriented films and fibers.

We claim:

1. A method for preparing halogenated esters which comprises reacting a compound selected from the class consisting of primary and secondary alcohols having one to two hydroxyl groups, said hydroxyl groups being attached to aliphatic carbon atoms free from unsaturation, with a halogenated chlorosulfate of the formula $$RCX_2OSO_2Cl$$

where R is a halogenated hydrocarbon radical which is at least half halogenated, said halogen substituents thereon selected from the group consisting of fluorine, chlorine and bromine, and where X is selected from the class consisting of fluorine and chlorine.

2. A method for preparing halogenated esters which comprises reacting a compound selected from the class consisting of primary and secondary alcohols having one to two hydroxyl groups, said hydroxyl groups being attached to aliphatic carbon atoms free from unsaturation, with a halogenated chlorosulfate of the formula $$RCX_2OSO_2Cl$$

where R is a radical selected from the class consisting of perfluoroalkyl, perfluorochloroalkyl, perfluorohydroalkyl and perfluorochlorohydroalkyl radicals and where X is selected from the class consisting of chlorine and fluorine.

3. A method for preparing halogenated esters which comprises reacting a compound selected from the class consisting of primary and secondary alcohols having one to two hydroxyl groups, said hydroxyl groups being attached to aliphatic carbon atoms free from unsaturation, with a halogenated chlorosulfate of the formula $$RCF_2OSO_2Cl$$

where R is a halogenated hydrocarbon radical which is at least half halogenated, said halogen substituents thereon selected from the group consisting of fluorine, chlorine and bromine.

4. A method for preparing halogenated esters which comprises reacting a compound selected from the class consisting of primary and secondary alcohols having one to two hydroxyl groups, said hydroxyl groups being attached to aliphatic carbon atoms free from unsaturation, with a halogenated chlorosulfate of the formula $$RCF_2OSO_2Cl$$

where R is selected from the class consisting of perfluoroalkyl, perfluorochloroalkyl, perfluorohydroalkyl, and perfluorochlorohydroalkyl radicals.

5. A method for preparing halogenated esters which comprises reacting a primary alkanol with a halogenated halosulfate of the formula $$RCX_2OSO_2X$$

where R is selected from the class consisting of perfluoroalkyl, perfluorochloroalkyl, perfluorohydroalkyl, and perfluorochlorohydroalkyl radicals and where X is selected from the class consisting of chlorine and fluorine.

No references cited.

LORRAINE A. WEINBERGER, *Primary Examiner.*

LEON ZITVER, *Examiner.*

UNITED STATES PATENT OFFICE
CERTIFICATE OF CORRECTION

Patent No. 3,248,419                              April 26, 1966

Murray Hauptschein et al.

It is hereby certified that error appears in the above numbered patent requiring correction and that the said Letters Patent should read as corrected below.

Column 2, line 32, before "than" insert -- rather --; column 3, line 73, for "$C_3H_7CH_2CF_2OSO_2Cl$" read -- $C_3F_7CH_2CF_2OSO_2Cl$ --; column 4, lines 24 and 25, the formula should appear as shown below instead of as in the patent:

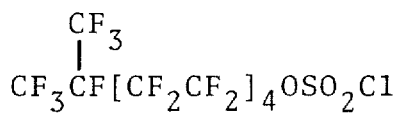

same column 4, lines 27 and 28, the formula should appear as shown below instead of as in the patent:

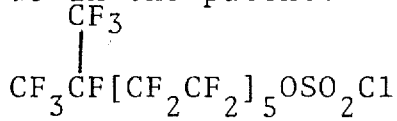

same column 4, line 44, for "$O_2NCH_2CF_2CF_2OSO_2Cl$" read -- $O_2NCF_2CF_2CF_2OSO_2Cl$ --; line 45, for "$CF_2CFClOSO_2Cl$" read -- $CF_3CFClOSO_2Cl$ --; column 7, line 36, for "reuuxed" read -- refluxed --; column 8, lines 30 and 31, the formula should appear as shown below instead of as in the patent:

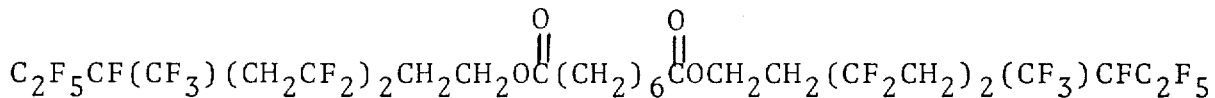

column 9, line 71, for "$C_{15}H_{14}F_{16}ClNO_2$:" read -- $C_{15}H_{14}F_{16}ClNO_2$:

column 11, lines 54 and 55, the formula should appear as shown 3,248,419 below instead of as in the patent:

$$C_2F_5CF(CF_3)(CH_2CF_2)_2CH_2\overset{O}{\overset{\|}{C}}O(CH_2)_5O\overset{O}{\overset{\|}{C}}CH_2(CF_2CH_2)_2(CF_3)CFC_2F_5$$

column 13, lines 4 to 6, the formula should appear as shown below instead of as in the patent:

$$ClS\overset{O}{\overset{\|}{\underset{\underset{O}{\|}}{O}}}CF_2(CH_2CF_2)_4O\overset{O}{\overset{\|}{\underset{\underset{O}{\|}}{S}}}Cl$$

Signed and sealed this 6th day of June 1967.

(SEAL)
Attest:

EDWARD M. FLETCHER, JR.
Attesting Officer

EDWARD J. BRENNER
Commissioner of Patents